UNITED STATES PATENT OFFICE 2,660,585

17-ALPHA-HYDROXY-4-PREGNENE-3,6,20-TRIONE AND PROCESS

Herbert C. Murray, Hickory Corners, and Durey H. Peterson, Kalamazoo, Mich., assignors to The Upjohn Company, Kalamazoo, Mich., a corporation of Michigan No Drawing. Application July 1, 1952, Serial No. 296,722

3 Claims. (Cl. 260—397.4)

The present invention relates to a new and useful steroid compound and more specifically, to 17α-hydroxy-4-pregnene-3,6,20-trione and to a method for the preparation thereof.

It is an object of this invention to provide 17α-hydroxy-4-pregnene-3,6,20-trione, a new and useful composition of matter having pharmacological activity and being additionally useful in the synthesis of various oxygenated steroids. Another object is to provide a process for the preparation of this compound. Other objects of the invention will be apparent to those skilled in the art to which this invention pertains.

The novel compound of the present invention, 17α-hydroxy-4-pregnene-3,6,20-trione, is also referred to as 6-keto-17α-hydroxyprogesterone and is represented by the following structural formula:

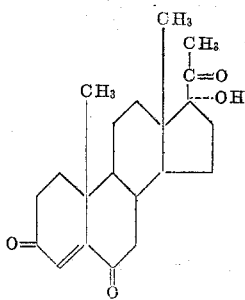

This compound is useful as an intermediate in the synthesis of pharmacologically active steroids. For example, upon dehydrating 17α-hydroxy-4-pregnene-3,6,20-trione thereby obtaining 4,16-pregnadiene-3,6,20-trione and then hydrogenating this compound with a mole of hydrogen in the presence of a suitable catalyst such as palladium-charcoal, and the like, the known estrogenic steroid, 6-ketoprogesterone is obtained (Ehrenstein, J. Org. Chem., 4, 506, 1939; Butenandt and Riegel, Ber., 69, 1163, 1936).

In addition, 17α-hydroxy-4-pregnene-3,6,20-trione exhibits anesthetic, corticoid, folliculoid, luteoid, and anti-hypertensive activity.

17α-hydroxy-4-pregnene-3,6,20-trione is prepared by reacting 6β,17α-dihydroxy-4-pregnene-3,20-dione, (6β,17α-dihydroxyprogesterone), with at least one equivalent of oxidizing agent per mole of 6β,17α-dihydroxy-4-pregnene-3,20-dione. Suitable oxidizing agents include potassium permanganate, N-bromosuccinimide in the presence of an acid binding agent, chromic acid and the like. The reaction mixture is maintained at a temperature range varying between about zero degrees centigrade and the boiling point of the reaction mixture. The preferred reaction temperature is approximately 25 degrees centigrade. The reaction time varies considerably depending upon the specific oxidizing agent employed and also the temperature at which the reaction is carried out.

The starting material in the aforementioned oxidation reaction, 6β,17α-dihydroxyprogesterone, may be prepared by subjecting 17α-hydroxyprogesterone to the action of a fungus of the order Mucorales as set forth in the applications of Murray and Peterson, Serial Number 180,496, filed August 19, 1950, now abandoned, and Serial Number 272,944, filed February 23, 1952, issued on July 8, 1952 as United States Patent 2,602,769, of which this application is a continuation-in-part.

The following preparation and example are illustrative of the objects, processes and product of the present invention, but are not to be construed as limiting.

PREPARATION.—6β,17α-DIHYDROXYPROGESTERONE

A medium was prepared of twenty grams of Edamine enzymatic digest of lactalbumin, three grams of corn steep liquor and fifty grams of technical dextrose diluted to one liter with tap water and adjusted to a pH of 4.3 to 4.5. Two liters of this sterilized medium was inoculated with *Rhizopus nigricans* minus strain, American Type Culture Collection No. 6227b, and incubated for 24 hours at a temperature of 28 degrees centigrade using a rate of aeration and stirring such that the oxygen uptake was 6.3 to 7 millimoles per hour per liter of $Na_2SO_3$ according to the method of Cooper, Fernstrom and Miller, Ind. Eng. Chem., 36, 504 (1944). To this medium containing a 24-hour growth of *Rhizopus nigricans* was added one gram of 17α-hydroxyprogesterone in 25 milliliters of acetone to provide a suspension of the steroid in the culture. After an additional 152-hour period of incubation under the same conditions of temperature and aeration, the beer and mycelium were extracted. The mycelium was filtered, washed twice, each time with a volume of acetone approximately equal to the volume of the mycelium and extracted twice, each time with a volume of methylene chloride approximately equal to the volume of the mycelium. The acetone and methylene chloride extracts including solvent were added to the beer filtrate. The mixed extracts and beer filtrate were extracted successively with two one-half by volume portions of methylene chloride and then with two one-fourth by volume portions of methylene chloride. The combined methylene chloride extracts were washed with two one-tenth by volume portions of a two percent aqueous solution of sodium bicarbonate and then with two one-tenth by volume portions of water. After drying the methylene chloride extract with about three to five grams of anhydrous sodium sulfate per liter of solvent and filtering, the solvent was removed by distillation. The residue was dissolved in a minimum of methylene chloride, filtered and the solvent was then evaporated. The resulting extract weighing 1.685 grams was dissolved in 100 milliliters of ethylene dichloride and chromatographed over 150 grams of Florisil synthetic magnesium silicate. Prior to the addition of the extract, the column was washed with 600 milliliters of acetone followed by 600 milliliters of ethylene dichloride. Solvents in 220-milliliter portions were used. Results are given in the table.

Another run was made as above and the corresponding chromatograph fractions were combined for purposes of isolation.

Fractions 13 to 17 were recrystallized from methanol by the addition of ether to yield 260 milligrams of $11\alpha,17\alpha$-dihydroxyprogesterone which melted at 220 to 222 degrees centigrade, had an optical rotation $[\alpha]_D^{24}$ of plus 76 degrees (1.1323 in chloroform) and an ultraviolet extinction $k_{243}$ of 46.67.

*Analysis.*—Calculated for $C_{21}H_{30}O_4$: C, 72.32; H, 8.73. Found: C, 73.18; H, 8.76. C, 72.85; H, 8.47.

The mother liquors of fractions 13 to 17 and fractions 11, 12 and 18 to 20 were combined and rechromatographed in the same manner over 150 grams of Florisil thus yielding another 102 milligrams of $11\alpha,17\alpha$-dihydroxyprogesterone.

Fraction 10 yielded a second compound, $6\beta,17\alpha$-dihydroxyprogesterone melting at 256 to 258 and 228 to 235 degrees centigrade, analyzing as $C_{21}H_{30}O_4$ and having an optical rotation $[\alpha]_D^{23}$ of plus four degrees (0.775 gram in chloroform).

TABLE

| Fraction | Solvent | Eluate solids, milligrams |
|---|---|---|
| 1 | Ethylene dichloride | 105.5 |
| 2,3 | Ethylene dichloride-acetone 25:1 | 177.0 |
| 4 | Ethylene dichloride-acetone 15:1 | 39.0 |
| 5 | do | 88.5 |
| 6-9 | Ethylene dichloride-acetone 12:1 | 225.5 |
| 10 | Ethylene dichloride-acetone 10:1 | 23.5 |
| 11,12 | do | 73.0 |
| 13-16 | Ethylene dichloride-acetone 8:1 | 316.5 |
| 17 | Ethylene dichloride-acetone 5:1 | 129.5 |
| 18-20 | do | 167.0 |
| 21-23 | Ethylene dichloride-acetone 2:1 | 134.5 |
| 24-26 | Acetone | 57.0 |

*Example.*—*6-keto-17α-hydroxyprogesterone*

To a solution containing 83 milligrams of $6\beta,17\alpha$-dihydroxyprogesterone dissolved in ten milliliters of glacial acetic acid was added 3.35 milliliters of chromic acid (0.0492 millimole of chromic acid per milliliter of glacial acetic acid) dropwise over a period of ten minutes. After maintaining the mixture at room temperature for one and three-fourths hours, two drops of methanol and thirty milliliters of water were added thereto. The reaction mixture was extracted with fifty milliliters of methylene chloride and then with fifty milliliters of ether. The solvent extracts were separately washed with one 25-milliliter portion of two percent bicarbonate solution and with two 25-milliliter portions of water. The washed solvent extracts were combined and evaporated to a dry crystalline mass. The product was recrystallized from three milliliters of acetone to which three milliliters of Skellysolve B petroleum ether had been added. The resulting product, melting at 210 to 220 degrees centigrade was again recrystallized from three milliliters of ethyl acetate. A yield of twelve milligrams of 6-keto-17α-hydroxyprogesterone in crystalline form, melting at 217 to 218 degrees centigrade was obtained.

It is to be understood that the invention is not to be limited to the exact details of operation or exact compounds shown and described herein, as obvious modifications and equivalents will be apparent to one skilled in the art, and the invention is therefore to be limited only by the scope of the appended claims.

We claim:

1. 17α-hydroxy-4-pregnene-3,6,20-trione.

2. A process for the preparation of 17α-hydroxy-4-pregnene-3,6,20-trione which comprises reacting 6β,17α-dihydroxy-4-pregnene-3,20-dione with an oxidizing agent to form 17α-hydroxy-4-pregnene-3,6,20-trione.

3. A process for the preparation of 17α-hydroxy-4-pregnene-3,6,20-trione which comprises reacting 6β,17α-dihydroxy-4-pregnene-3,20-dione with chromic acid to form 17α-hydroxy-4-pregnene-3,6,20-trione.

HERBERT C. MURRAY.
DUREY H. PETERSON.

No references cited.